US012753667B2

(12) United States Patent
McCormick

(10) Patent No.: US 12,753,667 B2
(45) Date of Patent: Oct. 6, 2026

(54) TOOL STRING TRANSPORTATION DEVICE

(71) Applicant: PETROMAC IP LIMITED, Auckland (NZ)

(72) Inventor: Stephen Peter McCormick, Auckland (NZ)

(73) Assignee: PETROMAC IP LIMITED, Auckland (NZ)

( * ) Notice: Subject to any disclaimer, the term of this patent is extended or adjusted under 35 U.S.C. 154(b) by 0 days.

(21) Appl. No.: 18/714,821

(22) PCT Filed: Nov. 23, 2022

(86) PCT No.: PCT/IB2022/061309
§ 371 (c)(1),
(2) Date: May 30, 2024

(87) PCT Pub. No.: WO2023/100033
PCT Pub. Date: Jun. 8, 2023

(65) Prior Publication Data

US 2025/0027372 A1 Jan. 23, 2025

(30) Foreign Application Priority Data

Dec. 3, 2021 (AU) ................................ 2021903925
Jun. 9, 2022 (AU) ................................ 2022901579

(51) Int. Cl.
*E21B 23/14* (2006.01)
*E21B 17/042* (2006.01)
(Continued)

(52) U.S. Cl.
CPC ............ *E21B 23/14* (2013.01); *E21B 17/042* (2013.01); *E21B 17/1057* (2013.01);
(Continued)

(58) Field of Classification Search
CPC .... E21B 23/14; E21B 17/042; E21B 17/1057; E21B 17/043; F16L 19/005; F16L 15/00
See application file for complete search history.

(56) References Cited

U.S. PATENT DOCUMENTS 1,281,756 A * 10/1918 Black .................. E21B 17/1057
166/241.3
1,762,057 A * 6/1930 Gates .................... E21B 17/043
403/320
(Continued)

OTHER PUBLICATIONS

Australian Patent Office, PCT/IB2022/061309, Written Opinion, Feb. 8, 2023, 5 pages.
(Continued)

*Primary Examiner* — Neel Girish Patel
(74) *Attorney, Agent, or Firm* — Niels Haun; Dann, Dorfman, Herrell & Skillman, P.C.

(57) ABSTRACT

A device for transporting a tool string down a bore comprises a body with a connection at one or both ends for in-line connection in a tool string, and a pair of wheels mounted to rotate relative to the body on a rotational axis perpendicular to a longitudinal axis. The device defines an outer form configured to orient the device in the bore during use so that a radial extremity of the wheels contacts a low side of a wall of the bore. The device further comprises an adjustment mechanism configured to provide for an angular orientation of the outer form of the device relative to an adjacent tool string section to be set, and a locking mechanism configured to lock the angular orientation relative to the adjacent tool string section so that the outer form of the device orients the device and adjacent tool string section in the bore.

20 Claims, 9 Drawing Sheets

(51) Int. Cl.

| | |
|---|---|
| ***E21B 17/043*** | (2006.01) |
| ***E21B 17/10*** | (2006.01) |
| ***F16L 15/00*** | (2006.01) |
| ***F16L 19/00*** | (2006.01) |

(52) U.S. Cl.
CPC ........... *F16L 19/005* (2013.01); *E21B 17/043* (2013.01); *F16L 15/00* (2013.01)

(56) References Cited

U.S. PATENT DOCUMENTS

| | | | | |
|---|---|---|---|---|
| 5,040,619 | A * | 8/1991 | Jordan | E21B 43/119 166/241.1 |
| 9,200,487 | B2 | 12/2015 | Draper et al. | |
| 9,863,198 | B2 | 1/2018 | McCORMICK | |
| 11,970,914 | B1 * | 4/2024 | McCormick | E21B 17/1057 |
| 2011/0227336 | A1 * | 9/2011 | Mogedal | E21B 17/085 285/314 |
| 2012/0145380 | A1 * | 6/2012 | Draper | E21B 23/14 166/241.3 |
| 2014/0367169 | A1 * | 12/2014 | Wheater | E21B 23/14 175/45 |
| 2018/0135359 | A1 * | 5/2018 | Hradecky | E21B 23/14 |
| 2018/0328131 | A1 * | 11/2018 | McCormick | E21B 17/1042 |
| 2020/0256162 | A1 * | 8/2020 | Angelis | E21B 41/00 |
| 2021/0002966 | A1 * | 1/2021 | Church | E21B 17/1057 |
| 2021/0002967 | A1 * | 1/2021 | Vasireddy | F16C 33/34 |
| 2024/0344413 | A1 * | 10/2024 | Fuglestad | E21B 23/001 |

OTHER PUBLICATIONS

Australian Patent Office, PCT/IB2022/061309, International Search Report, Feb. 8, 2023, 5 pages.

* cited by examiner

SECTION I-I

SECTION II-II

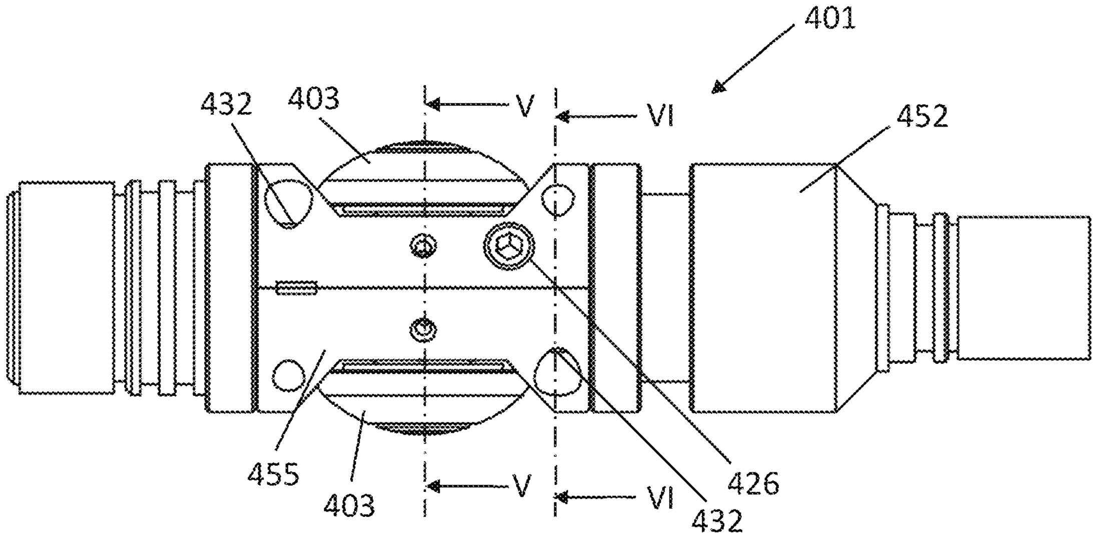
FIGURE 19
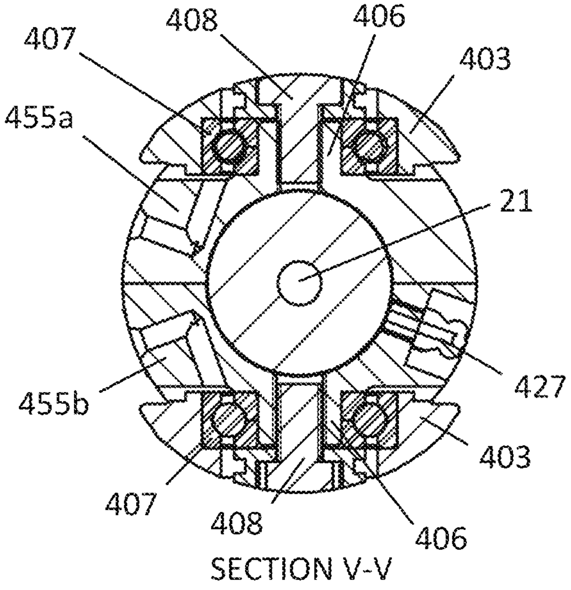
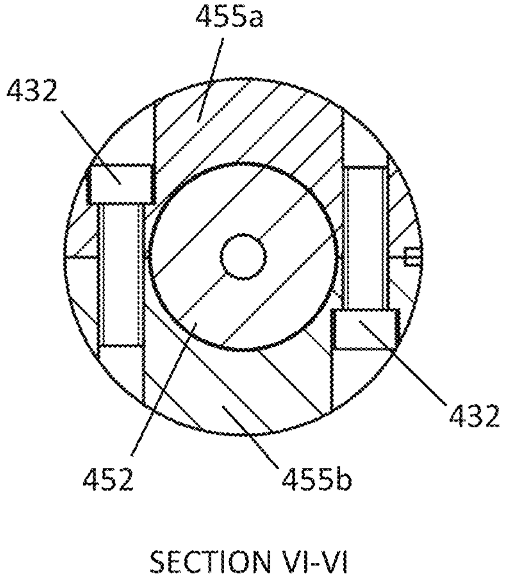
FIGURE 20
FIGURE 21

TOOL STRING TRANSPORTATION DEVICE

STATEMENT OF CORRESPONDING APPLICATIONS

This application is a national phase entry application of PCT application PCT/IB2022/061309 filed Nov. 23, 2022, which is based on the provisional specifications filed in relation to Australian Patent Application Numbers 2021903925 filed Dec. 3, 2021, and 2022901579 filed Jun. 9, 2022, the entire contents of each of which are incorporated herein by reference.

TECHNICAL FIELD

This invention relates to devices for use in transporting a tool string down a bore while maintaining a known orientation of the tool string within the bore.

BACKGROUND

Tool strings comprise one or more elongate sensor assemblies or tools for collecting data or performing operations down a well. Often it is desirable to orient a tool string in a known angular orientation within the wellbore. For example, where a tool string comprises perforating guns, it may be desirable to orient the gun device within the wellbore so that perforations are formed through a wellbore casing in desired radial directions.

Wellbores are drilled to a target depth covering a zone of interest, typically between 1000-5000 meters deep. The tool string is then lowered into the wellbore and descends under gravity to the target depth of the wellbore well. The tool string may be lowered on a wireline—being a collection of electrical communication wires which are sheathed in a steel cable connected to the functional components of the tool string.

The drilling of wells is an expensive undertaking. This is primarily due to the capital costs of the drilling equipment and the specialised nature of the tool string systems. It is important for these activities to be undertaken and completed as promptly as possible to minimise these costs. Delays in deploying a tool string are to be avoided wherever possible.

One cause of such delays is the difficulties in lowering a tool string to the target depth of the wellbore. The tool string is lowered by the wireline down the wellbore under the force of gravity alone. The wireline, being flexible, cannot push the tool down the wellbore. Hence the operator at the top of the well has very little control of the descent of the tool string or its angular orientation in the bore.

The chances of a tool string failing to descend is significantly increased with deviated wells. Deviated wells do not run vertically downwards and instead extend downward and laterally at an angle from vertical. Multiple deviated wells are usually drilled from a single surface location to allow a large area to be explored and produced. As tool strings are run down a wellbore under the action of gravity, the tool-string will drag along the low side or bottom of the wellbore wall as it travels downwards to the target depth. The friction or drag of the tool-string against the wellbore wall can prevent to tool descending to the desired depth. The long length of a tool string can further exacerbate problems with navigating the tool string down wellbore.

Friction may be reduced by using wheels. U.S. Pat. No. 9,200,487 describes a wheeled device for carrying a tool string down a well. The device comprises a mandrel configured to be connected in line in a tool string. A pair of wheels or rollers are rotationally mounted to an annular body or collar. The annular body or collar is mounted to the mandrel to rotate around the mandrel and longitudinal axis of the device and tool string. The rotating body or collar allows the tool string to rotate on its longitudinal axis relative to the wheeled device. A pair of bearing assemblies made up of ball bearings set in annular groove are provided between the collar and the mandrel to provide a low friction interface between the collar mandrel. The tool string is eccentrically weighted so that angular orientation of the tool string in the well bore is achieved regardless of the angular position of the wheeled device within the bore.

A reference to any prior art in the specification is not, and should not be taken as, an acknowledgement or any form of suggestion that the prior art forms part of the common general knowledge in any country.

DISCLOSURE OF INVENTION

It is an object of the present invention to address any one or more of the above problems or to at least provide the industry with a useful device for transporting a tool string down a bore.

According to a first aspect of the present invention, there is provided a device for transporting a tool string a bore, the device comprising:

- a body comprising a connection at one or both ends of the body for in-line connection of the device in a tool string;
- a pair of wheels mounted to rotate relative to the body on a rotational axis perpendicular to a longitudinal axis of the tool string;
- the device defining an outer form configured to orient the device in the bore during use so that a radial extremity of the wheels contact a low side of a wall of the bore;
- an adjustment mechanism configured to provide for an angular orientation of the outer form of the device relative to an adjacent tool string section to be set; and
- a locking mechanism configured to lock the angular orientation relative to the adjacent tool string section so that the outer form of the device orients the device and adjacent tool string section in the bore during use.

In some embodiments, the connection at one or both ends of the body comprises a connection thread, and

- wherein the adjustment mechanism comprises the connection thread, the connection thread providing for in-line connection to the adjacent tool string section and allowing the angular orientation of the device relative to an adjacent tool string section to be set.

In some embodiments, the locking mechanism comprises a threaded locking ring mounted to the body by a threaded engagement.

In some embodiments, the threaded engagement provides for an axial travel of the locking ring that is greater than an adjustment thread length of the connection thread required to achieve a desired angular orientation of the device relative to the adjacent tool string section.

In some embodiments, the locking ring is configured to rotate on the body to move axially along the body to frictionally engage an end of the adjacent tool string section to lock the relative angular positions of the device and adjacent tool string section.

In some embodiments, the connection thread has a thread length to provide for connection of the device to the adjacent tool string section and an adjustment thread length to allow for rotational adjustment between the device and the adjacent tool string section to set the angular orientation of the device relative to the adjacent tool string section.

In some embodiments, the adjustment thread length allows for any desired angular orientation of the device relative to the adjacent tool string section to be set.

In some embodiments, the device (the outer form of the device) has two orders of rotational symmetry to provide two stable positions with the device supported on the wheels in each stable position. The thread length provides an adjustment thread length that is at least half of a pitch of the connection thread to allow at least 180 degrees of relative rotation between the device and the adjacent tool string section.

In some embodiments, the device comprises a circumferential seal and a landing portion between the circumferential seal and the locking mechanism, and wherein the landing portion has an axial length to ensure a corresponding sealing face of the adjacent tool string section engages the seal for a maximum axial adjustment range required to set the angular position of the device relative to the adjacent tool string section.

In some embodiments, the device comprises:

- a collar rotationally mounted to the body to rotate relative to the body about the longitudinal axis of the tool string, and
- the pair of wheels rotationally mounted to the collar,
- wherein the adjustment mechanism comprises the collar with mounted wheels; and
- wherein the locking mechanism is configured to lock the angular position of the collar relative to the body of the device.

In some embodiments, the locking mechanism comprises one or more screws received in threaded holes in the collar to engage the body to lock the angular position of the collar to the body.

In some embodiments, the collar is a single unitary part, and the body comprises two parts a first part on which the collar is received, and a second part coupled to the first part.

In some embodiments, the second part retains the collar on the first part. The first and second parts each provide an end of the device, and the collar is positioned intermediate/between the ends of the device.

In some embodiments, the collar is retained axially between a shoulder on the first part and a shoulder on the second part.

In some embodiments, the first and second parts are coupled together by a threaded engagement.

In some embodiments, the device (the outer form of the device) has a width greater than its height.

In some embodiments, the outer form of the device presents lateral extremities that substantially lie on a curve on a plane orthogonal to the longitudinal axis of the device, and

- wherein the lateral extremities of the outer form of the device are lateral extremities of the wheels or the body and the wheels.

In some embodiments, the outer form of the device presents lateral extremities that substantially lie on a curve on a plane orthogonal to the longitudinal axis of the device and,

- wherein lateral extremities of the outer form of the device are lateral extremities of the wheels or the collar and the wheels.

In some embodiments, the curve is an elliptical curve or is a circular curve, or wherein the lateral extremities of the device lie on two circular curves spaced apart in a width direction of the device.

In some embodiments, the body comprises one or more lateral projections on each lateral side of the body on which each respective wheel is mounted, and wherein each lateral projection presents a lateral extremity of the device.

In some embodiments, the body comprises a pair of lateral projections on each lateral side of the body with a respective wheel located axially between the pair of lateral projections.

In some embodiments, the lateral projections extend beyond a lateral side of the respective wheel.

In some embodiments, the wheels projects below the lateral projections.

In some embodiments, the outer form of the device has two orders of rotational symmetry about the longitudinal axis of the device to provide two stable positions with the device supported on the wheels in each stable position.

In some embodiments, when connected in a tool string, the central longitudinal axis of the device is coincident with the central longitudinal axis of the tool string.

In some embodiments, the rotational axis of the wheels passes through the central longitudinal axis of the device.

In some embodiments, a wheel diameter of the wheels is greater than a maximum radial distance between a longitudinal axis of the device and a lateral extremity of the device.

In some embodiments, the body comprises a pair of stub axles, and each wheel is rotationally mounted on a respective stub axle of the body.

In some embodiments, the body comprising the stub axles is a unitary body member.

In some embodiments, a bearing assembly comprising rolling elements is provided between the wheel and axle.

According to a second aspect of the present invention, there is provided a device for transporting a tool string down a bore, the device comprising:

- a body comprising a connection at one or both ends of the body for in-line connection of the device in a tool string;
- a collar rotationally mounted to the body to rotate relative to the body about a longitudinal axis of the tool string, and
- a pair of wheels rotationally mounted to the collar to rotate relative to the body on a rotational axis perpendicular to the longitudinal axis of the tool string,
- wherein the collar is a single unitary part, and the body comprises two parts: a first part on which the collar is received, and a second part coupled to the first part.

A device according to the second aspect may comprise any one or more features of the device comprising the collar (when formed as a unitary part) as described above in relation to the first aspect.

According to a third aspect of the present invention, there is provided a method for setting up a tool string for running down a wellbore, the tool string comprising one or more devices as described above, the method comprising:

i) connecting the device to the adjacent tool string section,
ii) operating the adjustment mechanism to set the angular orientation of the outer form of the device relative to an adjacent tool string section, and
iii) operating the locking mechanism to lock the angular orientation relative to the adjacent tool string section so that the outer form of the device orients the device and adjacent tool string section in the bore during use.

In some embodiments, the device may comprise any one or more features of the device comprising a connection thread as described above for the first aspect, and the method comprises:

i) rotating the device or the adjacent tool string section on the connection thread to connect the device to the adjacent tool string section;

ii) rotating the device or adjacent tool string section on the connection thread until a desired angular orientation between the device and the adjacent tool string section is achieved;

iii) operating the locking mechanism to lock the relative angular position of the device to the adjacent tool string section.

In some embodiments, in step i) the method comprises rotating the device or the adjacent tool string section on the connection thread to connect the device to the adjacent tool string section until the connection thread has reached an end of travel.

In some embodiments, in step ii) the method comprises backing off the device from the adjacent tool string by rotating the device or adjacent tool string section on the connection thread in a direction of unthreading the device from the adjacent tool string section until the desired angular orientation between the device and the adjacent tool string section is achieved.

In some embodiments, the locking mechanism comprises a threaded locking ring mounted to the body by a threaded engagement, and in step iii) the method comprises:

rotating the locking ring on the body to move the locking ring axially along the body to frictionally engage an end of the adjacent tool string section to lock the relative angular positions of the device and adjacent tool string section.

In some embodiments, the device may comprise any one or more features of the device comprising a collar as described above for the first aspect, and the method comprises:

i) connecting the device to the adjacent tool string section, ii) rotating the collar on the body to set the angular orientation of the outer form of the device relative to an adjacent tool string section, and iii) operating locking mechanism to lock the angular position of the collar relative to the body of the device.

In some embodiments, the locking mechanism comprises one or more screws received in threaded holes in the collar and step iii) comprises rotating the one or more screws to engage the body and lock the angular position of the collar to the body.

In some embodiments, the tool string comprises at least one apparatus with wheels for carrying the tool string down the bore and in step ii) the method comprises operating the adjustment mechanism to set the angular orientation of the device relative to the adjacent tool string section so that the pair of wheels of the device is aligned parallel with the wheels of the apparatus. The apparatus with wheels may be a said device.

The tool string may comprise at least two said devices spaced apart along the tool string, and the method may comprise:

in steps i) to iii), set and lock the angular orientation of a first said device relative to the adjacent tool string section;

iv) repeating steps i) to iii) to set and lock the angular orientation of a second said device in the tool string so that the pair of wheels of the second device are aligned parallel with the pair of wheels of the first device.

In some embodiments, where the tool string comprises more than two devices, step iv) is repeated for each device so that the wheels of all of the devices in the tool string are aligned.

According to a fourth aspect of the present invention, there is provided a device for transporting a tool string down a bore, the device comprising:

a body comprising a connection thread at one or both ends of the body for inline connection of the device in a tool string;

a pair of wheels mounted to rotate relative to the body on a rotational axis perpendicular to a longitudinal axis of the tool string;

the device defining an outer form configured to orient the device in the bore during use so that the wheels contact a low side of a wall of the bore;

wherein the connection thread provides for in-line connection to an adjacent tool string section and allows for an angular orientation of the device relative to the adjacent tool string section to be set; and a locking mechanism configured to lock the angular orientation of the device relative to the adjacent tool string section so that the outer form of the device orients the device and adjacent tool string section in the bore during use.

A device according to the fourth aspect may comprise any one or more features of the device comprising the connection thread as described above in relation to the first aspect.

According to a fifth aspect of the present invention, there is provided a device for transporting a tool string down a bore, the device comprising:

a body comprising a connection at one or both ends of the body for inline connection of the device in a tool string;

a collar rotationally mounted to the body to rotate relative to the body about the longitudinal axis of the tool string;

a pair of wheels rotationally mounted to the collar to rotate relative to the body on a rotational axis perpendicular to a longitudinal axis of the tool string;

the device defining an outer form configured to orient the device in the bore during use so that the radial extremity of wheels contact a low side of a wall of the bore; and a locking mechanism configured to lock the angular position of the collar relative to the body of the device so that the outer form of the device orients the device and adjacent tool string section in the bore during use.

A device according to the fifth aspect may comprise any one or more features of the device comprising the collar as described above in relation to the first aspect.

Unless the context suggests otherwise, the term "wellbore" or similar terms should be understood to also refer to a casing pipe within a wellbore. Thus, the term 'wellbore wall' may refer to the wall of a casing within a wellbore.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent from the following description given by way of example of possible embodiments of the invention.

BRIEF DESCRIPTION OF THE DRAWINGS

An example embodiment of the invention is now discussed with reference to the Figures.

FIG. 9A shows a minimum thread engagement between the device and the adjacent tool string section, and FIG. 9B shows a maximum thread engagement between the device and the adjacent tool string section.

FIG. 19 is a top view of the device of FIG. 18.

FIG. 20 is a sectional view on line V-V in FIG. 19.

FIG. 21 is a sectional view on line VI-VI in FIG. 19.

BEST MODES FOR CARRYING OUT THE INVENTION

Figure 1:
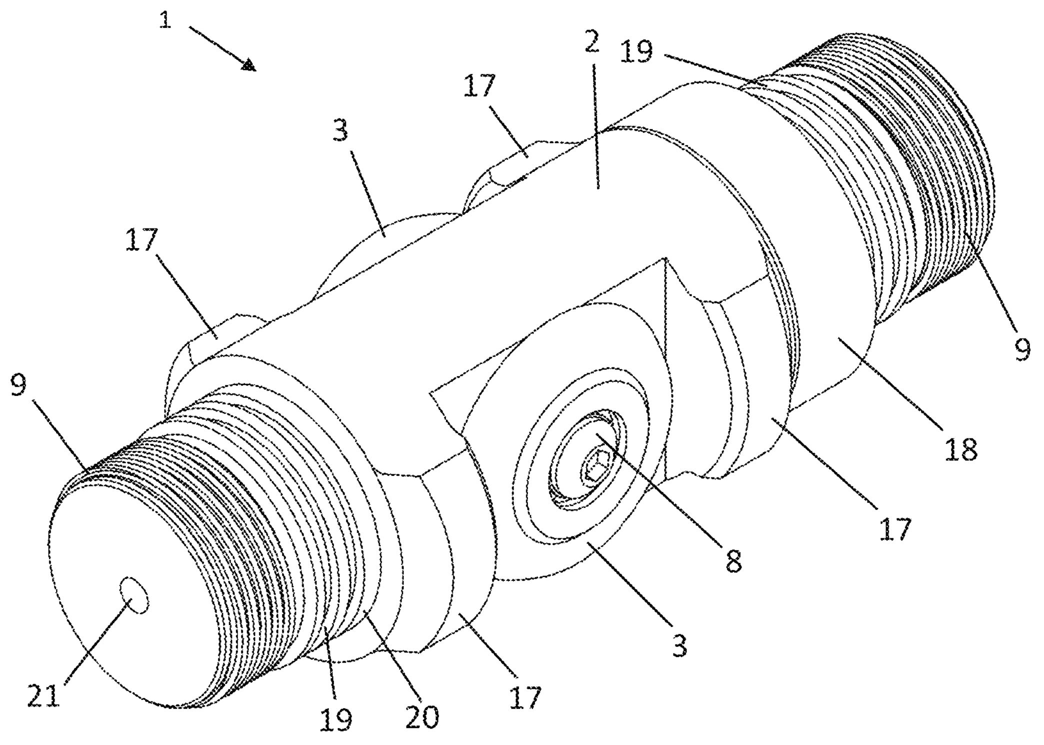
FIG. 1 illustrates a device for carrying a tool string down a well bore.
Figure 2:
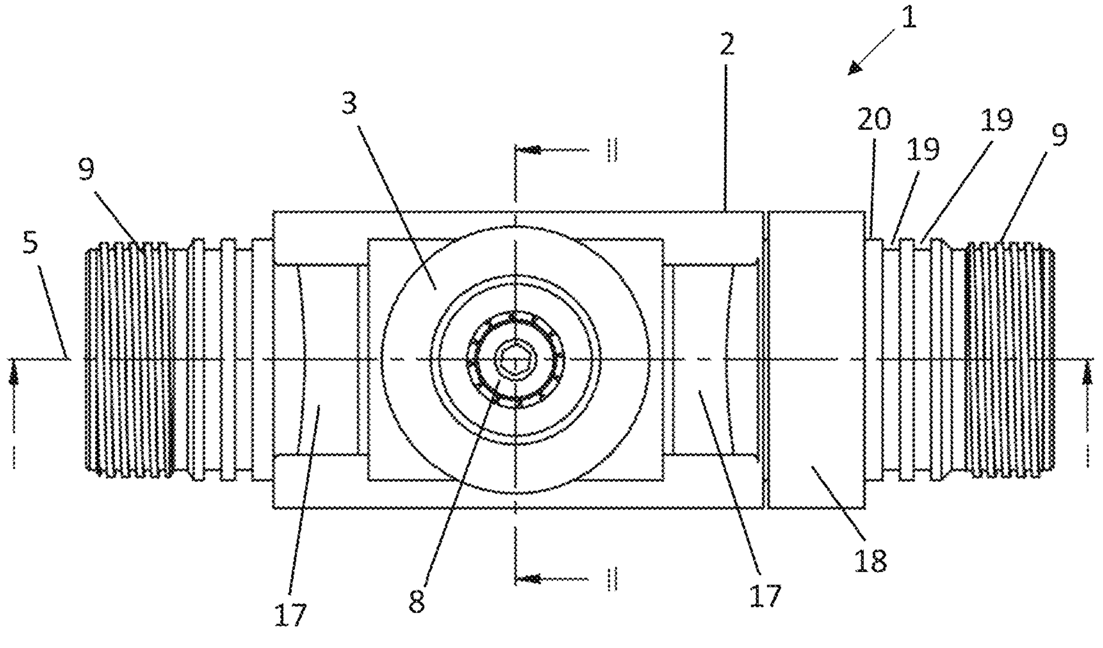
FIG. 2 is a side view of the device of FIG. 1.
Figure 3:
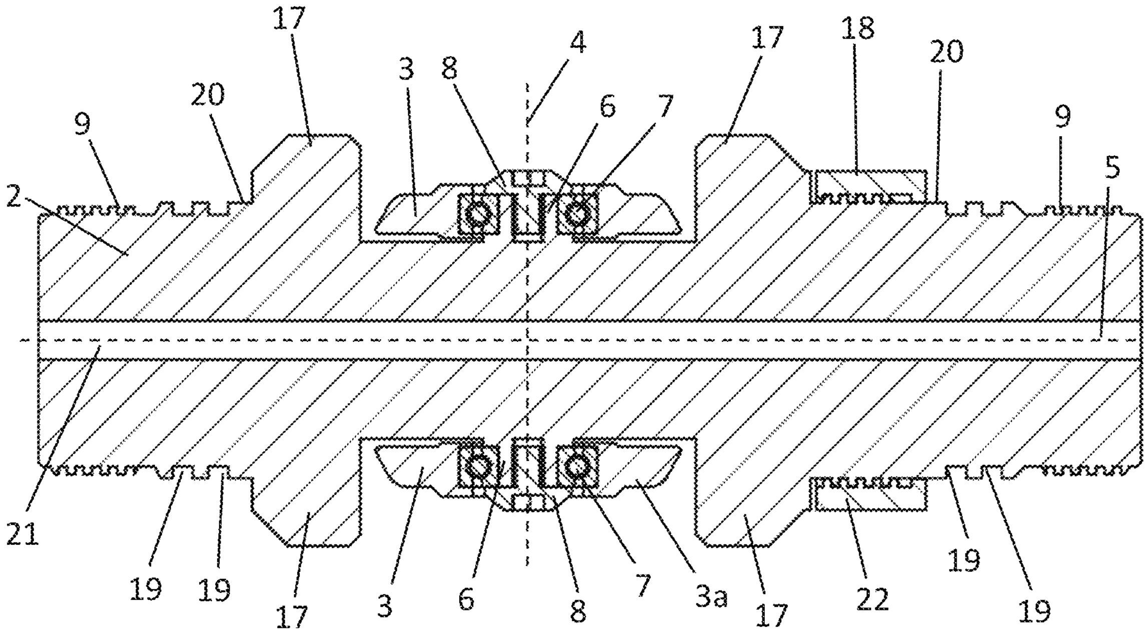
FIG. 3 is a sectional view on line I-I in FIG. 2.

FIG. 1 illustrates a device 1 for transporting a tool string on its wheels down a wellbore. The device 1 comprises a body or mandrel 2 (herein a body) and a pair of wheels 3 rotationally mounted to the body. Each wheel 3 is fixed to the body 2 to rotate relative to the body 2 on a rotational axis 4 perpendicular to a longitudinal axis 5 of the device 1 or tool string. In the illustrated embodiment and as shown in FIG. 3, the body comprises a pair of sub axles 6, and each wheel 3 is rotationally mounted on a respective stub axle of the body 2. A bearing assembly 7 is provided between the wheel 3 and axle to provide a low friction rotational coupling of the wheel 3 to the body 2. The bearing assembly 7 comprises rolling elements such as ball bearings or rollers. Alternatively, the bearing assembly may comprise plain bearings. The wheels are retained on the axles by fasteners or screws 8. The stub axles are fixed to the body, i.e. the wheels cannot rotate around the longitudinal axis of the device 1. The wheels have a single degree of freedom only, rotation on a single rotational axis. The body comprising the stub axles may be a unitary body member, i.e. the body with stub axles may be machined from a single blank or billet, or cast or 3D printed and machined post casting or printing.

The body 2 is configured for in-line connection in a tool string. At one or both ends the body has a connection thread 9 for inline connection to an adjacent part or section of the tool string, such as an elongate sensor assembly or apparatus such as a perforating gun. In the illustrated embodiment the connection thread 9 is a male thread to be coupled by threaded engagement to a corresponding female thread of the adjacent tool string section. However, in an alternative embodiment the connection thread 9 may be a female thread for connection to a corresponding male thread of the adjacent tool string section.

The body 2 of the device 1 has a through bore 21 extending the length of the body 2 to allow for detonating cord or communication lines, i.e. electrical cables and/or hydraulic lines, to pass through the body 2 and along the tool string. This allows for detonating cord and/or control signals and/or power from surface to extend to a tool string section such as a perforating gun located in the tool string below the device 1.

Figure 5:
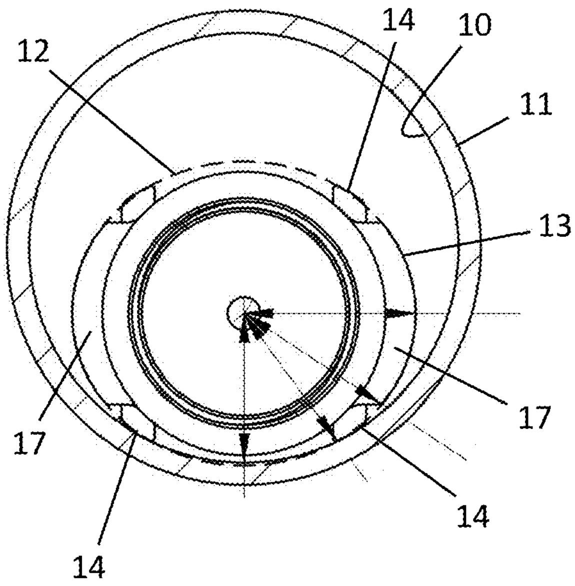
FIG. 5 is an end view of the device of FIG. 1 shown in a wellbore.

FIG. 5 presents an end view of the device 1 in a wellbore 10, shown in a horizontal orientation for clarity, with a radial extremity of the wheels (with respect to the rotational axis of the wheels) in contact with a low side of a wall 11 of the bore so that the device 1 is oriented to carry the tool string along the wellbore 10 on the wheels 3 of the device 1.

Figure 4:
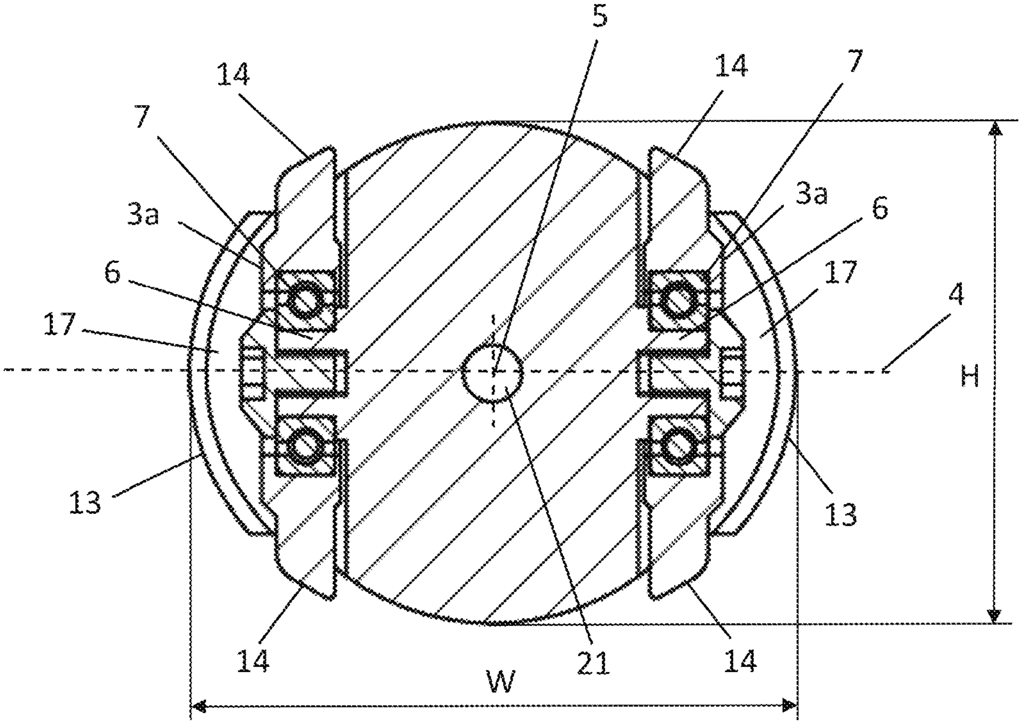
FIG. 4 is a sectional view on line II-II in FIG. 2.
Figure 6:
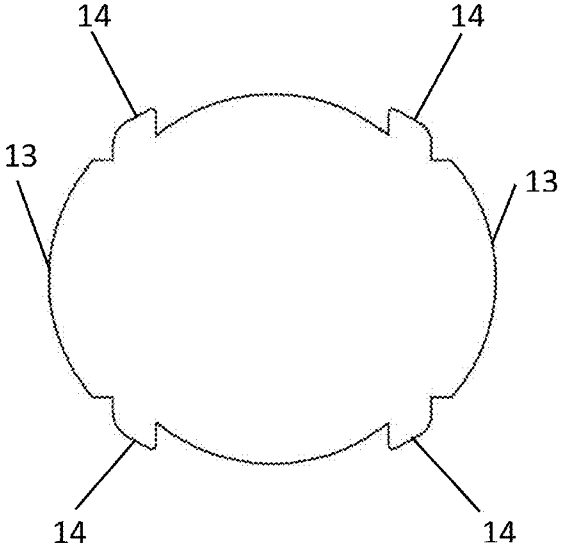
FIG. 6 shows an outer form of the device of FIG. 1 configured to orient the device in the bore to land on the wheels of the device.

As can be seen from FIGS. 4 and 5, in the example illustrated embodiment, the device defines an outer form that orients the device 1 in the bore 10 during use so that the wheels 3 contact the low side of the wall 11 of the bore. The outer form is a transverse outer form of the device 1, i.e. the outer form 15 is defined by a lateral outline of the device 1 viewed in an end view of the device, as shown in FIG. 6. The outer form of the device presents lateral extremities that substantially lie on a curve on a plane orthogonal to the longitudinal axis of the device. For example, as shown in FIG. 5, lateral extremities 13, 14 of the outer form substantially lie on an elliptical curve 12 orthogonal to the longitudinal axis 5 of the device 1. Thus, the outer form of the device has a width W greater than its height H, or in other words is elongated in the width direction of the device. The width W is in the direction of the rotational axis of the wheels. The height H is in a direction perpendicular to the rotational axis of the wheels and the width direction. The outer form therefore orients the device onto its wheels. Should the device end up on its side with a lateral extremity 13 of the device in contact with the low side of the wellbore, the device will be unstable as the elongated width direction of the device will be vertical with the centre of gravity of the device furthermost from the low side of the wellbore. The centre of gravity of the device is at or near to the central axis 5 of the device. The device is most stable when the elongated width direction is horizontal, with the device supported on its wheels. In this stable position the centre of gravity of the device is closest to the bottom of the wellbore. Hence the mass of the device and the adjacent tool string is at the lowermost stable position.

In the illustrated embodiment, lateral extremities of the body 2 and wheels 3 line on the curve. However, in some embodiments, the lateral extremities of only the wheels may lie on the curve to orient the device in the bore.

By example, a lateral extremity is considered to substantially lie on a curve when the lateral extremity is within about 3 mm of the curve. In the illustrated embodiment of FIG. 5, the lateral extremities 13 of the body 2 have the same curvature as the curve 12 and lie on the curve 12, whereas the lateral extremities 14 of the wheels have a different curvature to that of the curve 12, yet in the context of the invention, substantially lie on the curve 12. The curvature of the lateral extremities 14 of the wheels (i.e. the radial extremities of the wheels) may match the curvature of the wellbore.

Figure 7:
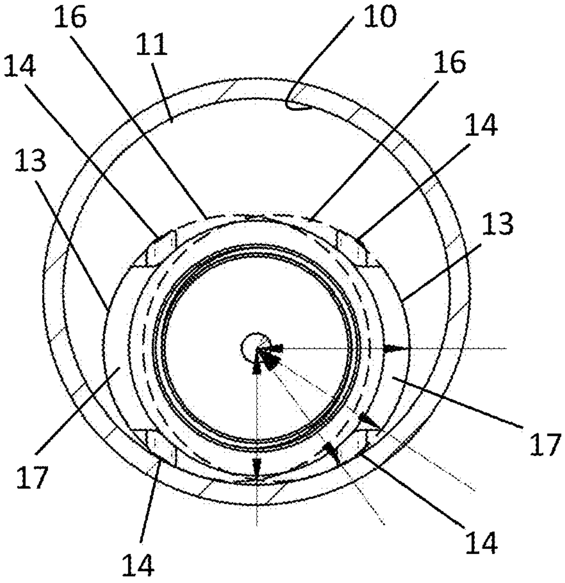
FIG. 7 is an end view of another device for carrying a tool string down a well bore.
Figure 8:
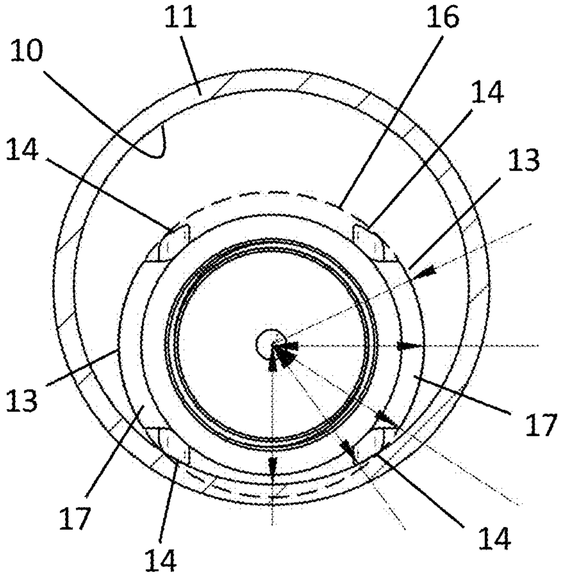
FIG. 8 is an end view of another device for carrying a tool string down a well bore.

An elliptical curved outer form is provided by way of example. Other outer forms with an elongated width dimension are possible. For example, FIG. 7 illustrates an outer form in which the lateral extremities 13, 14 of the device substantially lie on two circular curves 16 spaced apart in the width direction of the device. Further the curve or curves on which the outer extremities lie may not be elongated or spaced apart in the width direction. For example, FIG. 8 illustrates an example embodiment in which the lateral extremities 13, 14 of the device substantially lie on a circular curve 16. However, given the body 2 does not contact the wellbore wall between the wheels, that is the body does not have a lateral extremity lying on the curve 16 between the wheels, the outer form of the device is elongated in the width direction, having a greater width W than height H.

In the illustrated embodiments, the body 2 presents a lateral extremity 13 at a lateral side of the body 2, i.e the side of the device on which a respective wheel is mounted. The body comprises a pair of lateral projections 17 on each lateral side of the body 2, with a respective wheel 3 located axially between the pair of projections 17. Each lateral projection 17 presents a lateral extremity 13 of the device. The projections 17 extend beyond a lateral side (3*a*, FIGS. 3 and 4) of the respective wheel 3. The lateral projections 17 of the body 2 therefore prevent the lateral side 3*a* of the wheels 3 contacting the wellbore wall. With the wheel 3 received between the pair of lateral projections 17 on each lateral side of the device the wheel is protected from impacts as the device traverses the wellbore. The wheel projects below the lateral projections so the radial extremity 14 of each wheel 3 contacts the well bore wall to carry the device and tool string down the wellbore. Only about 20% or less of the wheel diameter extends below the lateral projection so that any impact on the wheel acts near the outer diameter of the wheel, causing the wheel to spin rather than damage to the wheel. While the device comprises a pair of lateral projections 17 at each lateral side of the body, with the wheel received therebetween, alternatively the device may comprise more than two projections 17, or a single lateral projection 17 at each lateral side of the body to protect the wheel, however a single projection is less preferred.

In the illustrated embodiment the outer form of the device has two orders of rotational symmetry about the longitudinal axis of the device 1, to provide two stable positions with the device supported on its wheels in each stable position, i.e. the device 1 can be rotated on the central longitudinal axis 5 by 180 degrees to run either way up on the wheels. The wheels project above and below the lateral projections of the body so that the radial extremities 14 of the wheels 3 are exposed above and below the lateral projections 17 to contact the well bore wall regardless of which way up the device 1 is run in the wellbore. Only about 20% or less of the wheel diameter extends above and below the lateral projections. When connected in a tool string, the central longitudinal axis 5 of the device is coincident with the central longitudinal axis of the tool string. The rotational axis 4 of the wheels 3 passes through the central axis 5, so that the regardless of which way up the device is the device remains centred on the central axis of the tool string. The diameter of the wheels is relatively large, i.e. the wheel diameter is greater than a maximum radial distance between the longitudinal axis 5 of the device and a lateral extremity of the device.

As described above, the body 2 has a connection thread 9 at at least one end for inline connection to an adjacent section of the tool string. The embodiment of FIG. 1 has a connection thread 9 at each end of the body 2. The connection thread 9 is configured to connect the device to an adjacent tool string section. Additionally, the connection thread 9 allows for a particular angular orientation of the device 1 and therefore the outer form 15 of the device about the longitudinal axis 5 relative to an adjacent tool string section to be set by turning the device 1 relative to the adjacent tool string section on the thread 9 when connecting the device in a tool string prior to running the tool string down a bore. For example, the device 1 or adjacent tool string section may be rotated on the connection thread 9 to connect the device 1 to the adjacent tool string section until the thread 9 has bottomed out (i.e. reached an end of travel along the thread) on the corresponding thread of the adjacent tool string section). Then, the device 1 may be backed off from the adjacent tool string section by rotating the device or tool string section on the connection thread in a direction of unthreading the device from the adjacent tool string section until a desired angular orientation between the device 1 and the adjacent tool string section is achieved. Thus, the connection thread provides an adjustment mechanism to set the angular orientation of the device relative to an adjacent tool string section.

The thread 9 must provide sufficient thread length to allow for a secure connection between the device 1 and the adjacent tool string section while also allowing for rotational adjustment between the device 1 and the adjacent tool string section to achieve a desired relative angular orientation of the outer form of the device 1 relative to the adjacent tool string section. For example, for a $3\frac{3}{8}$" diameter tool string, a known connection thread is $2\frac{13}{16}$-6 ACME 2G thread with a major diameter of 2.808 inch and a minor diameter of 2.7052 inch. At a thread pitch of 6 threads per inch, 0.083 in of axial travel equates to a 180 degree of rotation between the device and the adjacent tool string section. For a device 1 comprising two positions of rotational symmetry, this provides for any desired relative angular orientation between the device and the adjacent tool string section. For the above example thread, a thread length of 1.5 inches is sufficient to provide for 0.083 inch adjustment thread length to allow for sufficient rotational adjustment between the device and tool string section to achieve any desired relative angular orientation between the device and the tool string without compromising the connection between the device and tool string.

Thus, the connection thread 9 should provide an adjustment thread length of at least half the pitch of the thread, in this example, 0.083 inch given a thread pitch of 0.166 inch (6 threads per inch). In a device without rotational symmetry, an adjustment thread length of at least one pitch of the thread should be provided to provide 360 degrees of rotation.

Figure 9A:
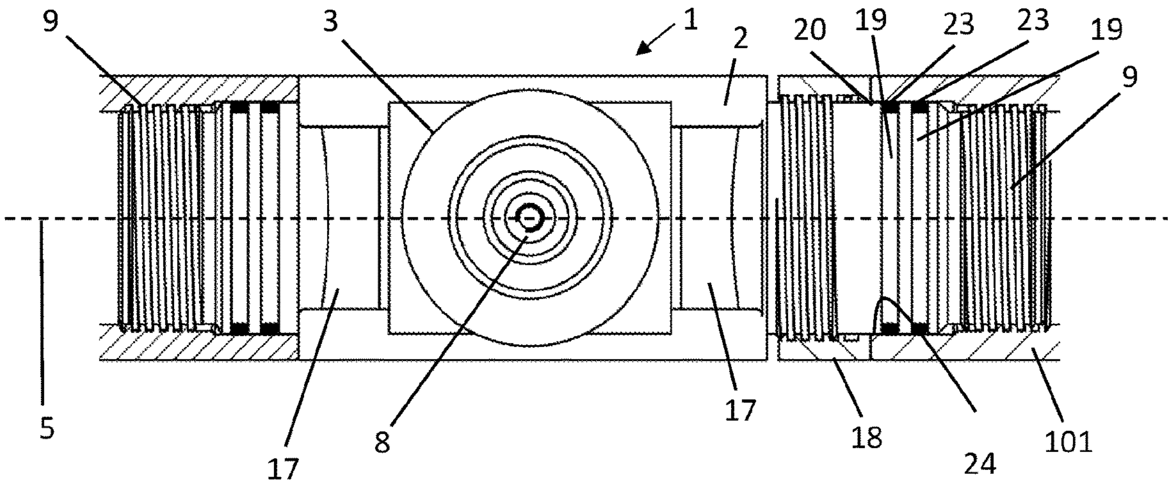
FIGS. 9A and 9B show the device of FIG. 1 connected to an adjacent tool string section.
Figure 9B:
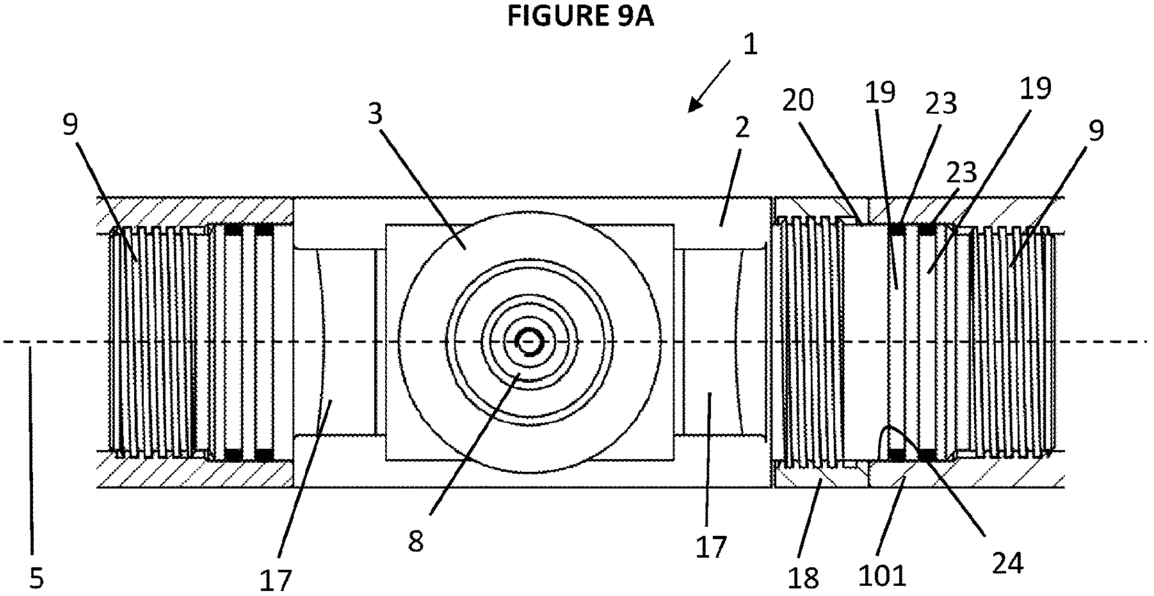
Figure 10:
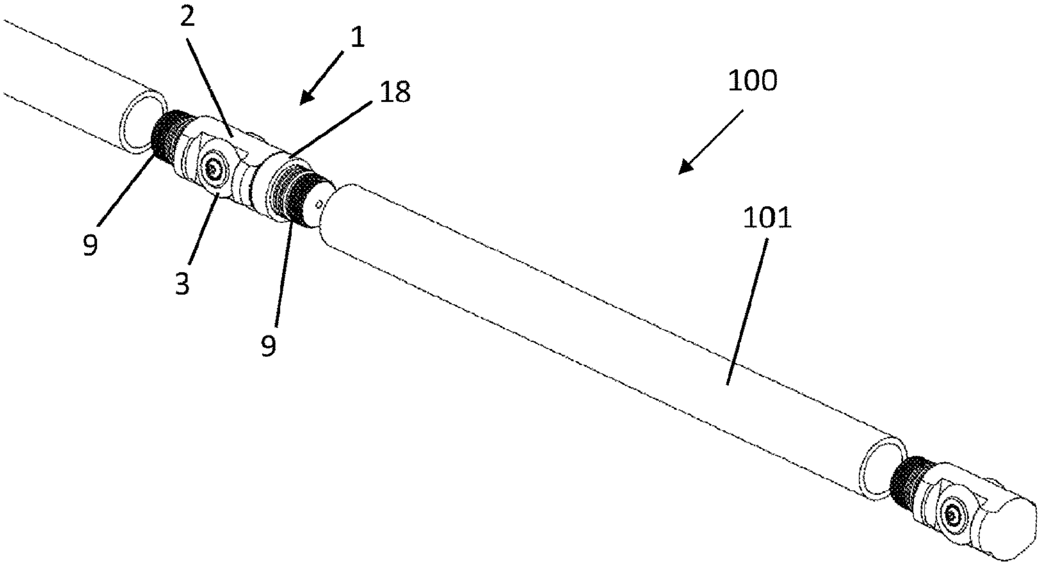
FIG. 10 is an exploded view of a tool string 100 comprising the device 1 of FIG. 1 connected between two adjacent tool string sections 101. Another wheeled device is attached at a forward end of the tool string.
Figure 11:
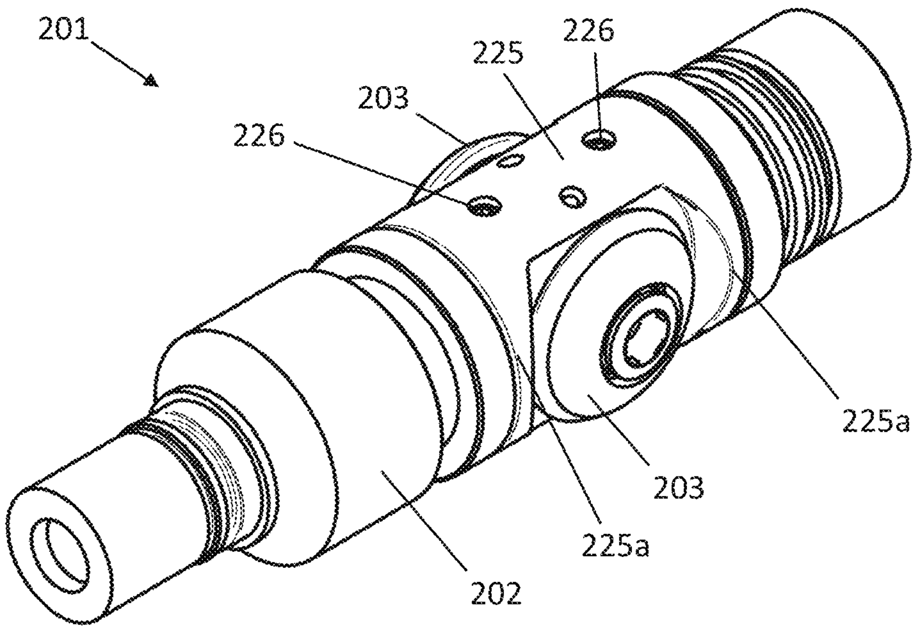
FIG. 11 illustrates another device for carrying a tool string down a well bore.
Figure 12:
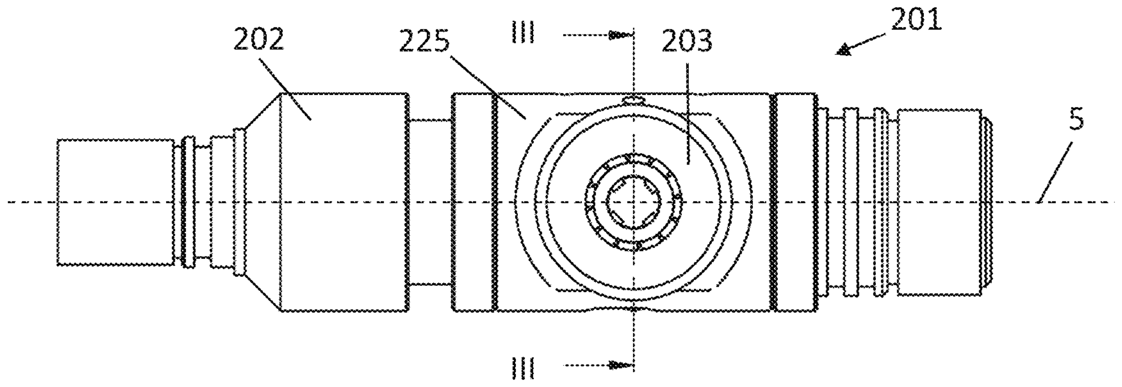
FIG. 12 is a side view of the device of FIG. 11.
Figure 13:
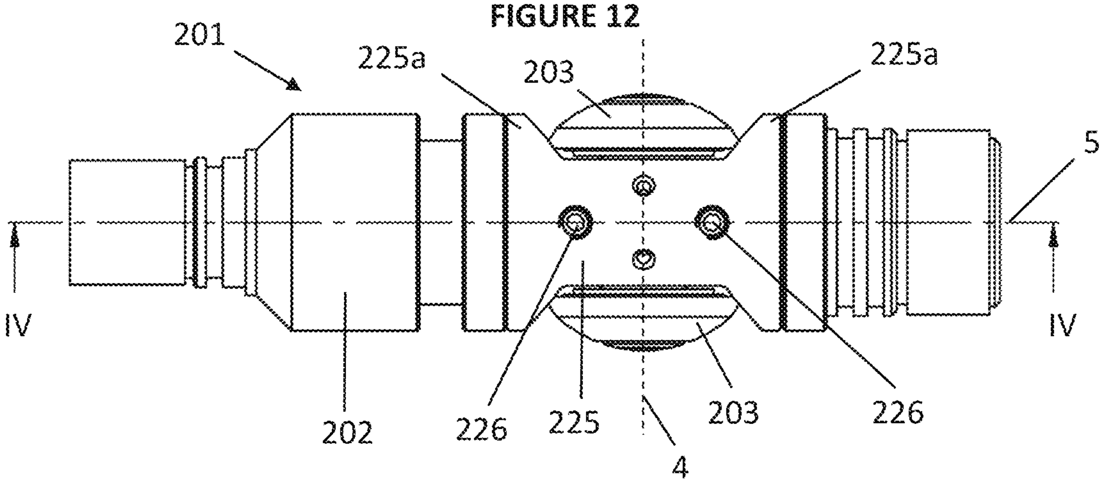
FIG. 13 is a top view of the device of FIG. 11.

To lock the angular orientation of the device relative to the adjacent tool string section, the device 1 further comprises a locking ring 18 mounted to the body 2 adjacent to the connection thread 9. The locking ring locks the relative angular position between the device 1 and the adjacent tool string section. Once the desired relative angular orientation between the device 1 and the adjacent tool string section has been set, the locking ring 18 is rotated on the body 2 to move axially along the body 2 to frictionally engage an end of the adjacent tool string section to lock (i.e. hold or fix) the relative angular positions of the device and adjacent tool string section. The locking ring 18 is engaged to the body 2 by a threaded engagement 22. The threaded engagement provides for an axial travel of the locking ring 18 greater than the adjustment thread length required to achieve a desired relative angular orientation, or any desired relative angular orientation, between the device 1 and the adjacent tool string section. FIGS. 9A and 9B show the device 1 connected to an adjacent tool string section 101. FIG. 9A shows a minimum thread engagement between the device 1 and the adjacent tool string section 101 and with the locking ring 18 engaging the adjacent tool string section to lock the relative angular orientation of the device to the tool string. FIG. 9B shows a maximum thread engagement between the device 1 and the adjacent tool string section 101 with the locking ring engaging the adjacent tool string section to lock the relative angular orientation of the device to the tool string.

One or more circumferential grooves 19 may be provided to the body 2 to receive annular seals (e.g. o-rings 23 in FIGS. 9A and 9B) to provide a fluid tight circumferential seal between the device 1 and the adjacent tool string section. The illustrated embodiment has a pair of seal grooves 19. The body 2 has a landing portion 20 between the seal groove 19 and the locking ring 18. The landing portion 20 has a sufficient axial length to ensure a corresponding sealing face 24 of the adjacent tool string section engages a seal 23 received in the seal groove 19 for a maximum axial adjustment range required to set the angular position of the device relative to the adjacent tool string section. For example, a standard sealing interface may be modified to make the seal groove(s) narrower and/or move the seal groove(s) closer to the connection thread to provide a sufficient landing portion 20 axial length to ensure the sealing face of the adjacent tool string section engages the seal for the full adjustment range of movement required. Alternatively, the seals may be provided to the adjacent tool string section and the device 1 comprises a circumferential sealing face, with a sufficient length to allow for engagement with the seals over the full axial adjustment range required to set the angular position of the device relative to the adjacent tool string section.

The device of FIG. 1 has a locking ring at one end however a locking ring may be provided adjacent the connection thread 9 at both ends of the device should a desired angular orientation of the adjacent tool string section connected at both ends of the device be required.

Other locking mechanisms may be used in place of the threaded locking ring 18 to lock the angular orientation between the device 1 and adjacent tool string component. For example, one or more screws or pins may be provided through aligned radial holes in the adjacent tool string component and body of the device, with the body comprising radial holes spaced apart around a circumference of the body to provide for a plurality of angular orientations to be set and fixed between the device 1 and adjacent tool string component. However, a threaded locking ring 18 together with the connection thread 9 provides for any angular orientation of the device to the adjacent tool string section.

A tool string will typically be provided with at least two wheeled devices spaced apart along the tool string to carry the tool string down a well. The angular orientation of a first device in the tool string may be adjusted on the connection thread 9 and then locked by the locking mechanism 18 as described above. A second device 1 may then be set to have the same angular orientation as the first device by adjustment on its connection thread 9 and then the angular orientation of the second device locked by the locking mechanism 18, again as described above, so that the wheels of the first and second devices are aligned (parallel). The process of aligning the wheels of further devices may be repeated until all devices are connected in the tool string with the wheels of all devices aligned. The tool string may then be run down the bore 10, with the devices orienting the tool string in the desired orientation within the bore.

With the angular orientation of the device 1 locked to the adjacent tool string section, the outer form of the device 1 not only orients the device in the wellbore but also orients the tool string. Thus, by setting and locking the relative angular positions of the device and the adjacent tool string section, the device acts to orient the tool string in the wellbore. No other complicated orientation arrangement is required, such as providing a swivel joint between the device and other sections of the tool string or providing the wheels on a rotational sleeve received on the body or mandrel of the device that must rotate relative to the body during use.

FIGS. 11 to 16 illustrate another a device 201 for transporting a tool string on its wheels down a wellbore. The device 201 comprises a body or mandrel 202 (herein a body). The body 202 is configured for inline connection in a tool string and may comprise any connection interface known in the art at one or both ends for connecting with a tool string. The connections between the mandrel 202 and an adjacent tool string section prevents relative rotation between the device 201 and the tool string.

Figure 16:
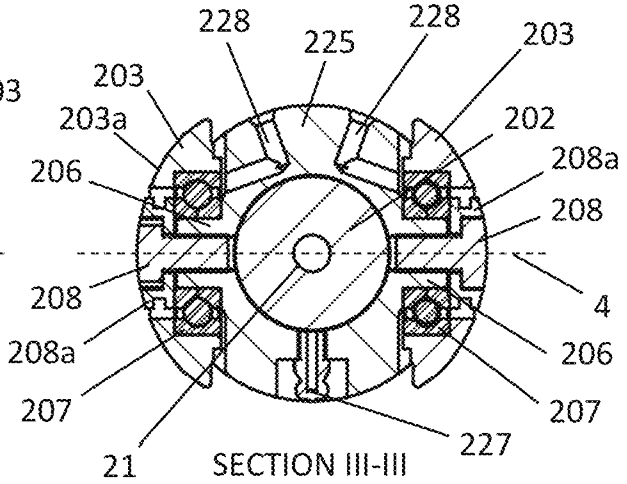
FIG. 16 is a sectional view on line III-III in FIG. 12.

An annular member or collar 225 (herein a collar) is rotationally mounted to the body 202 to rotate relative to the body 202 about a longitudinal axis 5 of the device 202/tool string. The collar is mounted axially between ends of the body. For example, the collar is axially between connection threads at each end of the body. A pair of wheels 203 are rotationally mounted to the collar 225. Each wheel 203 is fixed to the collar 225 to rotate relative to the collar and therefore the body 202 on a rotational axis 4 perpendicular to the longitudinal axis 5 of the device 201 or tool string. In the illustrated embodiment and as shown in FIG. 16, the collar 225 comprises a pair of sub axles 206, and each wheel 203 is rotationally mounted on a respective stub axle of the collar 225. A bearing assembly 207 is provided between the wheel 203 and axle 206 to provide a low friction rotational coupling of the wheel 203 to the collar 225. As described above for the first embodiment, the bearing assembly 207 comprises rolling elements such as ball bearings or rollers, or plain bearings. The wheels are retained on the axles by fasteners or screws 208. A washer 208*a* (FIG. 16) may be provided between the screw 208 and bearing 207/axle 206. The washer 208*a* may be a locking washer to engage the axle, e.g. in a keyed relationship, to prevent relative rotation between the axle and washer to prevent torque transferring to the screw. In use the wheels contact the wellbore wall to carry the tool string down the wellbore.

The device 201 further comprises a locking mechanism to lock the collar 225 relative to the body 202 to prevent relative rotation between the collar 225 and body 202. The locking mechanism is configurable between an unlocked position to allow the collar 225 to rotate relative to the body 202, and a locked position to fix the collar 225 to the body 202 to prevent relative rotation therebetween. In the locked position, an angular position of the collar 225 relative to the body 202 is locked/fixed, which locks/fixes an angular orientation of the wheels 203 relative to the body and an adjacent tool string section. The wheels or wheels and collar may provide the device with an outer form for orienting the device and connected tool string within the bore. Therefore, fixing the angular orientation of the collar with wheels to the body fixes the angular orientation of the outer form of the device relative to the adjacent tool string section, to orient the tool string in the wellbore when carried on the wheels of the device in use. With the collar locked to the body, the wheels 203 cannot rotate around the longitudinal axis 5 of the device 201. The device 201 has an outer form that orients the device 201 in the bore 10, for example like form 15 as described above with reference to FIG. 6 for the earlier described embodiment 1. Therefore, the device 201 comprising a rotatable and lockable collar 225 carrying the wheels 203 provides a means to orient a tool string within a bore to a known angular orientation so that a desired angular direction (or azimuth) for a tool string section such as a perforating gun within the bore is achieved.

Figure 15:
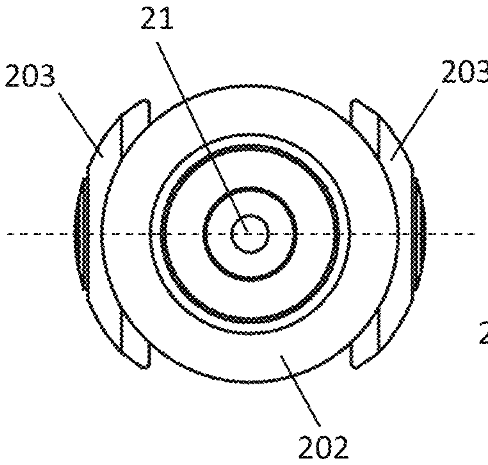
FIG. 15 is an end view of the device of FIG. 11.

As noted above, the device 201 has an outer form that orients the device 201 in the bore 10. The outer form illustrated in FIGS. 15 and 16 is similar to the outer form 15 shown in FIG. 6, however is achieved by a shape of outer lateral sides 203*a* of the wheels, rather than the shape of lateral projections of the body 202. The outer lateral sides 203*a* of the wheels 203 may include the fasteners 208 and/or washers 208*a*. The angular orientation of the outer form 15 of the device is therefore determined by the angular orientation of the wheels 203 relative to the body 202 of the device 201. In the illustrated embodiment, the wheels 203 only provide lateral extremities of the outer form of the device. One skilled in the art will appreciate that the outer form of the device 201 configured to orient the device may be provided by lateral extremities of the wheels 203 and the collar 225 (refer FIG. 22), in which case the angular orientation of the outer form 15 of the device is determined by the angular orientation of the wheels 203 and collar 225 relative to the body 202 of the device. The outer extremities of the wheels or the wheels and the collar may lie on an ellipse, a circle or offset circles or other curve as described with reference to FIGS. 5 to 8. Thus, the collar 225 with wheels 203, the collar rotationally mounted on the body 202, provides an adjustment mechanism to set the angular orientation of the outer form of the device relative to an adjacent tool string section.

Prior to running the device 201 in a tool string down a wellbore, an operator (a person or personnel) may configure the device to carry the tool string in a desired angular orientation within the bore. The operator connects the body 202 to the adjacent tool string section, e.g. a perforating gun. With the locking arrangement in the unlocked position, the operator rotates the collar 225 with wheels 203 on the body 202 about the longitudinal axis of the device 201 to a desired angular position relative to the body 202 and connected tool string section. With the collar 225 and wheels 203 in the desired angular position, the operator then locks the relative position of the collar 225 to the body 202 by moving the locking arrangement to the locked position, to set the angular orientation of the collar 225 and wheels 203 relative to the body 202 and therefore tool string. With the collar 225 locked to the body 202, the tool string may then be run down the bore 10, with the device orienting the tool string in the desired orientation within the bore 10.

In the illustrated embodiment the locking mechanism comprises a pair of screws 226 (i.e. grub screws) received in threaded holes in the collar. The screws are rotated to engage against the body 202 to lock the rotational position of the collar to the body. One or more screws may be provided. Alternatively, other locking mechanisms may be provided. For example, the device may comprise a locking ring 1 to engage the collar 225, like the locking ring 18 described above in relation to the first embodiment.

With the collar 225 locked to the body 202 during a downhole operation, no movement between the collar and the body occurs in operation. It is therefore unnecessary to provide sophisticated bearing arrangements or roller elements between the collar and the body. The illustrated embodiment has the collar received directly on the body, forming a plain bearing arrangement. A grease nipple 227 may be provided to the collar 225 or body 202 to allow lubricant/grease to be applied between the collar and body.

With no roller elements or the like required between the collar 225 and the body 202, a space saving is achieved which allows for the axles 206 and roller bearing elements 207 to be applied to the collar 225 to support low friction rotation of the wheels. The stub axles 206 may be integrally formed with the collar 225, i.e. the collar with stub axles may be machined from a single blank or billet, or cast or 3D printed and machined post casting or printing. The collar 225 may be provided with galleries 228 to provide lubricant to the wheel bearings. The galleries may be sealed/plugged off during operation.

Figure 14:
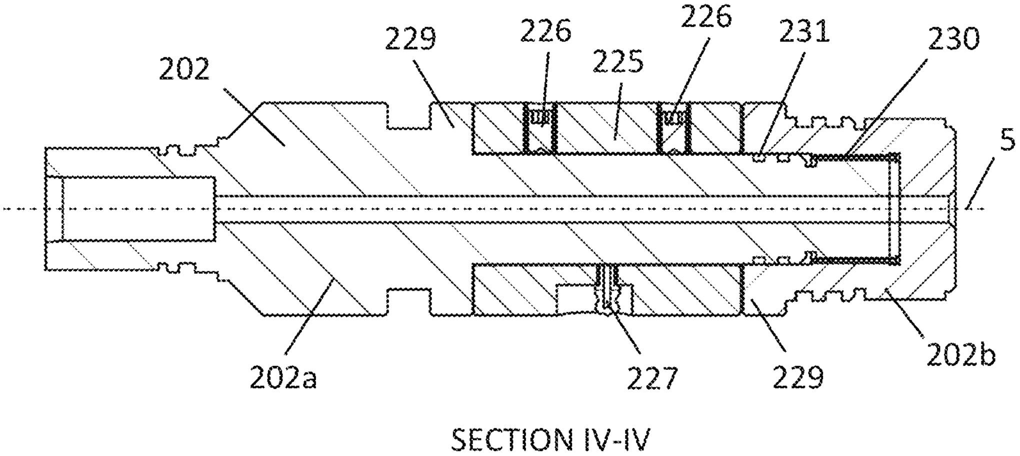
FIG. 14 is a sectional view on line IV-IV in FIG. 13.

In the embodiment of FIGS. 11 to 16, the collar is a single unitary part. With reference to FIG. 14, to assemble the collar 225 to the body 202, the body is provided in two parts, a first part 202*a* on which the collar 225 is received, and a second part 202*b* coupled to the first part 202*a*. The first part is coupled to the second part to retain the collar 225 on the first part. The collar is retained axially between a shoulder 229 on the first part and a shoulder 229 on the second part. One or both of the first and second parts provide a connection to connect the device in-line in a tool string.

The first and second parts 202*a*, 202*b* are coupled together by a connection interface. In the illustrated embodiment, the connection interface comprises a threaded engagement 230. The first part on which the collar is received comprises a male thread and the second part comprises a corresponding female thread. Other connection interfaces may be provided, for example a key/pin extending through aligned keyways/holes in the first and second parts.

One or more seals 231 are provided between the first and second parts 202*a*, 202*b* to seal an inside of the device (i.e. the through bore 21 of the device 201) from the ambient environment/pressure in the wellbore. The ambient pressure in the wellbore is the hydrostatic pressure of the head of wellbore fluid in the wellbore.

Figure 22:
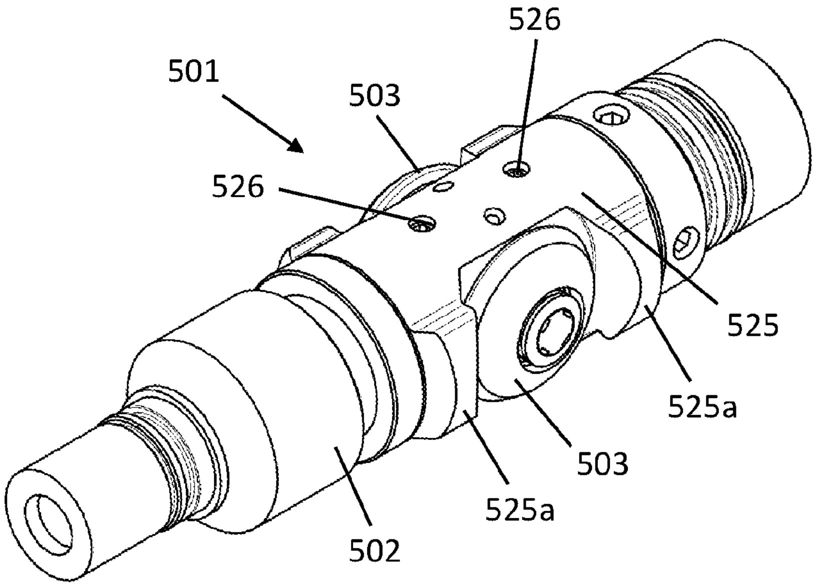
FIG. 22 illustrates another device for carrying a tool string down a well bore, similar to the device of FIG. 11, but with projections on a collar of the device forming an orienting outer form of the device.

Providing the body 202 in two parts allows for the collar 225 to be manufactured as a single unitary part, resulting in significant benefits. The collar 225 and stub axles 206 are manufactured in a single unitary part. Manufacturing costs are reduced. Machining the collar in pieces, e.g. two halves is far more expensive due to the extreme precision required. The two halves are joined and must form a perfect circular bore that is precisely aligned. However, a single unitary collar and a two-part mandrel are easier to manufacture as both the collar and the body components can be made in a turning operation (on a lathe). Furthermore, a unitary collar is stronger than a collar assembled from two halves that is secured together by fasteners. The increased strength of a unitary collar allows for lateral projections 225*a* to be provided to the collar 225 to protect the wheels 203 from damage and orient the device. As shown in FIG. 22, the lateral projections 525*a* on the collar may present lateral extremities of an outer form of the device 501 that orients the device in the bore 10 during use, as described above for the embodiment of FIG. 1 with lateral projection 17 on the body/mandrel. The device 501 is the same as the device 201 described above, but with the lateral projections 525*a* of the collar 525 providing radial extremities of the outer form of the device. The same or similar features described above for device 201 are referenced by the same reference numerals but for the prefix '2' replaced with prefix '5'. The same or similar features are not described again for brevity.

While the device with a unitary collar is described together with a locking mechanism to lock the collar to the body to prevent relative rotation therebetween, in one aspect, the device comprising a unitary collar may be without a locking mechanism so that the collar is configured to rotate relative to the body during use.

Figure 17:
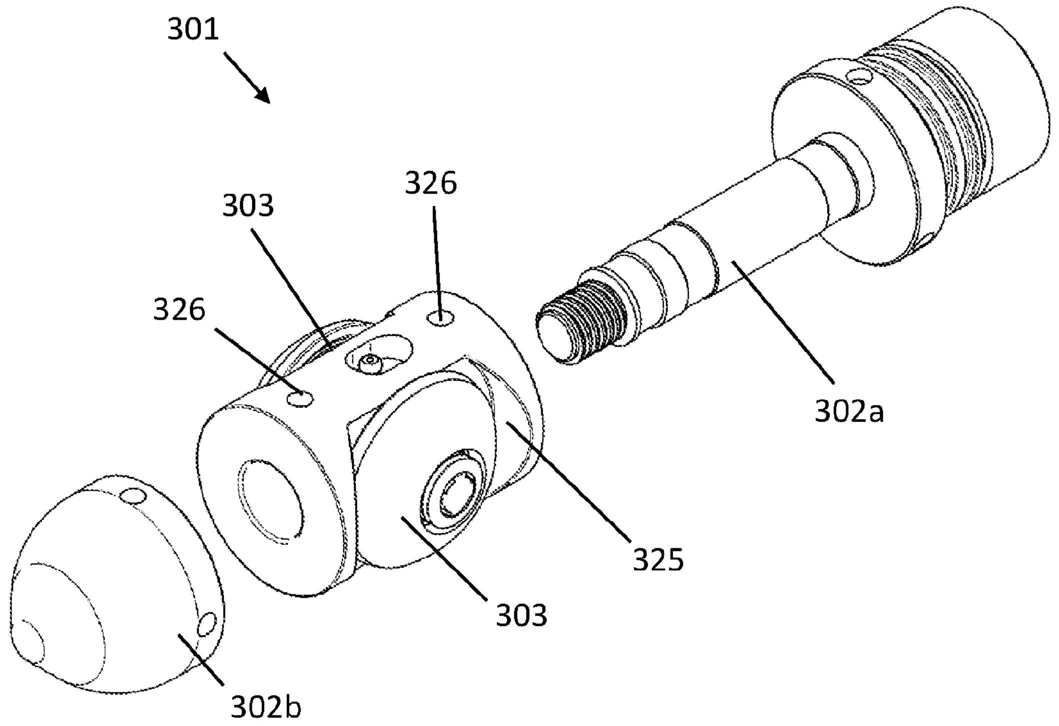
FIG. 17 is an exploded view of a device according to another embodiment of the invention for carrying a tool string down a well bore.
Figure 18:
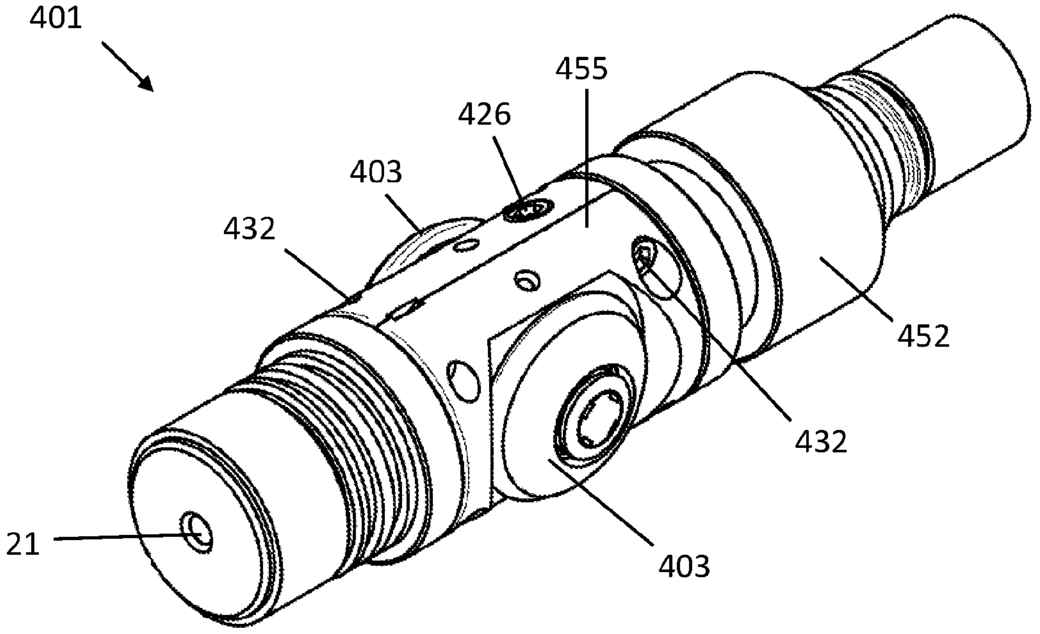
FIG. 18 illustrates a device according to another embodiment of the invention for carrying a tool string down a well bore.

FIG. 17 illustrates a further alternative embodiment 301 similar to the embodiment 201 described above, but with an end part or nose 302*b* at one end of the mandrel or body and an inline connection at the other end of the body, rather than an inline connection at each end of the body. The device 301 is therefore configured for connection at a leading end of a tool string. The device 301 is otherwise similar to the device 201 described above, with the same or similar features referenced by the same reference numerals but for the prefix '2' replaced with prefix '3'. The same or similar features are not described again for brevity.

FIGS. 18 to 21 illustrate a further alternative embodiment 401 in which the collar 455 is formed in two parts or halves 455*a* and 455*b*, the two parts held together by screws 432. The body 452 of the device is formed as a unitary part, and the two halves of the collar are assembled together on the body 452. In FIGS. 18 to 21, the locking mechanism to lock the angular orientation of the collar to the body is provided by a single screw 426. Features of embodiment 401 that are the same or similar to features described above for the device 201 are referenced by the same reference numerals but for the prefix '2' replaced with prefix '4'. The same or similar features are not described again for brevity.

The adjustment mechanism and locking mechanism can be operated to set and lock the orientation of the device relative to the adjacent the tool string section so that the wheels of devices spaced apart along the tool string are aligned. For example, a wheeled device or apparatus (with or without an adjustment mechanism and locking mechanism) may be connected to the tool string to carry the tool string down the bore. A second wheeled device with an adjustment mechanism and a locking mechanism as described above may be connected to the tool string. The angular orientation of the second device may then be set relative to the adjacent tool string section by the adjustment mechanism, and then the angular orientation of the second device locked by the locking mechanism, so that the wheels of the first and second devices are aligned (parallel). As described above, two or more devices may be connected in the tool string, with the adjustment and locking mechanisms of each device operated so that the wheels of all the devices are aligned parallel along the tool string.

A device according to one or more aspects of the present invention as described above provides one or more of the following benefits.

- The adjustment and locking mechanisms together provide a means to set and lock the orientation of the device within the tool string. This provides an easy way to align the wheels of devices spaced apart along the tool string to be parallel to carry the tool string down the wellbore, like the aligned wheels of carriages of a train.
- The device provides a means to orient a tool string within a bore to a known angular orientation so that a desired angular direction (or azimuth) for a tool string section such as a perforating gun within the bore is achieved.
- The heavy weight of the tool string is carried by wheels that have relatively larger diameter. Large diameter wheels reduce rolling friction, assisting travel of the device and tool string down hole, including in deviated bores.
- The device is relatively simple, requiring no swivel joint between the device and adjacent tool string section, or wheels mounted to the body of the device on a rotating sleeve or a sleeve that must rotate relative to the mandrel/tool string under gravity during deployment.
- Avoiding the requirement for a sleeve on the body of the device to rotate during use creates precious space to accommodate efficient rolling element bearings for mounting the wheels, such as ball bearings or roller bearings. Rolling element bearings are more efficient than plain bearings utilised for mounting wheels in other tool string transportation devices due to space constraints.
- Large diameter wheels also allow for efficient rolling elements to be used. Small diameter rollers or wheels present space constraints that makes using efficient roller bearings difficult or impossible.
- The device is a passive device. No power input, such as electrical or hydraulic power provided from surface located power units is required. The invention therefore provides a lower cost, effective, and simplified device that provides improved operational reliability.
- The device is robust and provides a small number of moving parts reducing maintenance requirements and improving reliability.

The invention has been described with reference to device for transporting a tool string in a wellbore. However, a device according to the present invention may be used in other applications, for example to carry a camera along a pipe for inspection purposes.

Although this invention has been described by way of example and with reference to possible embodiments thereof, it is to be understood that modifications or improvements may be made thereto without departing from the spirit or scope of the appended claims.

The invention claimed is:

1. A device for transporting a tool string down a bore, the device comprising:

a mandrel comprising a connection at one or both ends of the mandrel for in-line connection of the device in the tool string, the connection at one or both ends of the mandrel comprising a connection thread;

a pair of wheels mounted to rotate relative to the mandrel on a rotational axis perpendicular to a longitudinal axis of the tool string;

the device defining an outer form configured to orient the device in the bore during use so that a radial extremity of the wheels contact a low side of a wall of the bore;

an adjustment mechanism configured to provide for adjustment of an angular orientation of the outer form of the device relative to an adjacent tool string section; and a locking mechanism moveable between a locked position and an unlocked position to lock and unlock the adjustment mechanism, in the locked position the locking mechanism fixes the outer form of the device at any desired angular orientation relative to the adjacent tool string section so that the outer form of the device orients the device and adjacent tool string section at the desired angular orientation in the bore during use;

wherein the adjustment mechanism comprises the connection thread, the connection thread providing for in-line connection to the adjacent tool string section and allowing the angular orientation of the device relative to the adjacent tool string section to be adjusted to any desired angular orientation; and wherein the locking mechanism comprises a threaded locking ring mounted to the mandrel by a threaded engagement to rotate on the mandrel to move axially along the mandrel to frictionally engage an end of the adjacent tool string section to lock the relative angular positions of the device and adjacent tool string section.

2. The device as claimed in claim 1, wherein the connection thread has a thread length to provide for connection of the device to the adjacent tool string section and an adjustment thread length to allow for rotational adjustment between the device and the adjacent tool string section to set the angular orientation of the device relative to the adjacent tool string section.

3. The device as claimed in claim 2, wherein the outer form of the device has two orders of rotational symmetry to provide two stable positions with the device supported on the wheels in each stable position, and the thread length provides the adjustment thread length that is at least half of a pitch of the connection thread to allow at least 180 degrees of relative rotation between the device and the adjacent tool string section.

4. The device as claimed in claim 1, wherein the outer form of the device has lateral extremities that substantially lie on a curve on a plane orthogonal to the longitudinal axis of the device, and wherein the lateral extremities of the outer form are lateral extremities of the wheels or the mandrel and the wheels.

5. The device as claimed in claim 1, wherein the outer form of the device has a width greater than its height.

6. A method for configuring the tool string for running down the wellbore, the tool string comprising one or more devices as claimed in claim 1, the method comprising:

i) rotating the device or the adjacent tool string section on the connection thread to connect the device to the adjacent tool string section;

ii) rotating the device or adjacent tool string section on the connection thread until the desired angular orientation between the device and the adjacent tool string section is achieved; and iii) rotating the locking ring on the mandrel to move the locking ring axially along the mandrel to frictionally engage an end of the adjacent tool string section to lock the relative angular positions of the device and adjacent tool string section to lock the relative angular position of the device to the adjacent tool string section.

7. The method as claimed in claim 6, wherein the tool string comprises at least one apparatus with wheels for carrying the tool string down the bore and in step ii) the method further comprises rotating the device or adjacent tool string section on the connection thread to set the angular orientation of the device relative to the adjacent tool string section so that the pair of wheels of the device is aligned parallel with the wheels of the apparatus.

8. The method as claimed in claim 6, wherein the tool string comprises at least two said devices spaced apart along the tool string, and the method comprises:

steps i) to iii) to set and lock the angular orientation of a first device of the at least two said devices relative to the adjacent tool string section;

iv) repeating steps i) to iii) to set and lock the angular orientation of a second device of the at least two said devices in the tool string so that the pair of wheels of the second device are aligned parallel with the pair of wheels of the first device.

9. A device for transporting a tool string down a bore, the device comprising:

a mandrel comprising a connection at one or both ends of the mandrel for inline connection of the device in the tool string;

a collar rotationally mounted on the mandrel between the ends of the mandrel to rotate relative to the mandrel about a longitudinal axis of the tool string;

a pair of wheels rotationally mounted to the collar to rotate relative to the mandrel on a rotational axis perpendicular to the longitudinal axis of the tool string;

the device defining an outer form configured to orient the device in the bore during use so that the radial extremity of wheels contact a low side of a wall of the bore; and a locking mechanism moveable between a locked position and an unlocked position to lock and unlock the collar to the mandrel, in the locked position the locking mechanism fixes the outer form of the device at any desired angular orientation relative to the mandrel so that the outer form of the device orients the device and adjacent tool string section at the desired angular orientation in the bore during use.

10. A method for configuring a tool string for running down a wellbore, the tool string comprising one or more devices as claimed in claim 9, the method comprising:

i) connecting the device to the adjacent tool string section, ii) rotating the collar on the mandrel to set the angular orientation of the outer form of the device relative to the adjacent tool string section to the desired angular orientation, and iii) operating locking mechanism to lock the angular position of the collar relative to the mandrel of the device.

11. The method as claimed in claim 10, wherein the locking mechanism comprises one or more screws received in respective one or more threaded holes in the collar and step iii) comprises rotating the one or more screws to engage the mandrel and lock the angular position of the collar to the mandrel.

12. The method as claimed in claim 10, wherein the tool string comprises at least one apparatus with wheels for carrying the tool string down the bore and in step ii) the method further comprises rotating the collar on the mandrel to set the angular orientation of the device relative to the adjacent tool string section so that the pair of wheels of the device is aligned parallel with the wheels of the apparatus.

13. The method as claimed in claim 10, wherein the tool string comprises at least two said devices spaced apart along the tool string, and the method comprises:

steps i) to iii) to set and lock the angular orientation of a first device of the at least two said devices relative to the adjacent tool string section;

iv) repeating steps i) to iii) to set and lock the angular orientation of a second device of the at least two said devices in the tool string so that the pair of wheels of the second device are aligned parallel with the pair of wheels of the first device.

14. The device as claimed in claim 9, wherein the locking mechanism comprises one or more screws received in respective one or more threaded holes in the collar to engage the mandrel to lock the angular position of the collar to the mandrel.

15. The device as claimed in claim 9, wherein the collar is a single unitary part, and the mandrel comprises two parts, a first part on which the collar is received, and a second part coupled to the first part.

16. The device as claimed in claim 9, wherein the outer form of the device has lateral extremities that substantially lie on a curve on a plane orthogonal to the longitudinal axis of the device and, wherein the lateral extremities of the outer form are lateral extremities of the wheels or the collar and the wheels.

17. The device as claimed in claim 9, wherein the outer form of the device has a width greater than its height.

18. A device for transporting a tool string down a bore, the device comprising:

a mandrel comprising a connection at one or both ends of the mandrel for in-line connection of the device in the tool string, the connection at one or both ends of the mandrel comprising a connection thread;

a pair of wheels mounted to rotate relative to the mandrel on a rotational axis perpendicular to a longitudinal axis of the tool string;

the device defining an outer form configured to orient the device in the bore during use so that a radial extremity of the wheels contact a low side of a wall of the bore;

an adjustment mechanism configured to provide for adjustment of an angular orientation of the outer form of the device relative to an adjacent tool string section; and a locking mechanism moveable between a locked position and an unlocked position to lock and unlock the adjustment mechanism, in the locked position the locking mechanism fixes the outer form of the device at any desired angular orientation relative to the adjacent tool string section so that the outer form of the device orients the device and adjacent tool string section at the desired angular orientation in the bore during use;

wherein the adjustment mechanism comprises the connection thread, the connection thread providing for in-line connection to the adjacent tool string section and allowing the angular orientation of the device relative to the adjacent tool string section to be adjusted to any desired angular orientation; and wherein the connection thread has a thread length to provide for connection of the device to the adjacent tool string section and an adjustment thread length to allow for rotational adjustment between the device and the adjacent tool string section to set the angular orientation of the device relative to the adjacent tool string section.

19. The device as claimed in claim 18, wherein the outer form of the device has two orders of rotational symmetry to provide two stable positions with the device supported on the wheels in each stable position, and the thread length provides the adjustment thread length that is at least half of a pitch of the connection thread to allow at least 180 degrees of relative rotation between the device and the adjacent tool string section.

20. The device as claimed in claim 18, wherein the outer form of the device has lateral extremities that substantially lie on a curve on a plane orthogonal to the longitudinal axis of the device, and wherein the lateral extremities of the outer form are lateral extremities of the wheels or the mandrel and the wheels.

* * * * *